US010338907B2

(12) United States Patent
Zhou et al.

(10) Patent No.: US 10,338,907 B2
(45) Date of Patent: Jul. 2, 2019

(54) CLOUD SERVICE FRAMEWORK FOR TOOLKIT DEPLOYMENT

(71) Applicant: SAP SE, Walldorf (DE)

(72) Inventors: Yiquan Zhou, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 15/368,669

(22) Filed: Dec. 4, 2016

(65) Prior Publication Data

US 2018/0157479 A1 Jun. 7, 2018

(51) Int. Cl.
G06F 9/445 (2018.01)
G06F 8/65 (2018.01)
H04L 29/08 (2006.01)
G06F 8/36 (2018.01)

(52) U.S. Cl.
CPC ............. *G06F 8/65* (2013.01); *G06F 8/36* (2013.01); *H04L 67/02* (2013.01); *H04L 67/04* (2013.01); *H04L 67/10* (2013.01); *H04L 67/34* (2013.01)

(58) Field of Classification Search
CPC ........................................................ G06F 8/65
USPC ........................................................ 717/178
See application file for complete search history.

(56) References Cited

U.S. PATENT DOCUMENTS

| | | | |
|---|---|---|---|
| 5,613,101 A * | 3/1997 | Lillich ...................... | G06F 8/71 709/230 |
| 5,923,878 A * | 7/1999 | Marsland ............ | G06F 9/45512 717/139 |
| 7,194,728 B1 * | 3/2007 | Sirota ...................... | G06F 8/658 717/106 |
| 2004/0177335 A1 | 9/2004 | Beisiegel et al. | |
| 2005/0066325 A1 * | 3/2005 | Mori ......................... | G06F 8/61 717/174 |
| 2007/0028227 A1 * | 2/2007 | Lebowitz ................... | G06F 8/20 717/168 |
| 2011/0276961 A1 * | 11/2011 | Johansson ................. | G06F 8/61 717/178 |

(Continued)

OTHER PUBLICATIONS

John Wargo, "PhoneGap Development, Testing and Debugging", Jul. 10, 2012, http://www.informit.com/articles/printerfriendly/1915792 (Year: 2012).*

(Continued)

*Primary Examiner* — Wei Y Zhen
*Assistant Examiner* — Lanny N Ung
(74) *Attorney, Agent, or Firm* — Jones Day

(57) ABSTRACT

Described is a system, method, and computer-implemented apparatus for deploying and updating toolkits in hybrid cloud-local development platforms. In one embodiment, a cloud based software development environment is connected with a local development environment, enabling the cloud based software development environment (cloud environment) to inquire into the toolkit versions installed on the local machine. Once missing or incompatible versions of toolkits are identified, the cloud environment uses the connector module to instruct the local machine to download and install the appropriate toolkit version. The connector may use any types of bi-directional communication channels, such as a browser plugin, a web server hosted on the local machine, web services, or the like.

17 Claims, 3 Drawing Sheets

(56) References Cited

U.S. PATENT DOCUMENTS

| | | | |
|---|---|---|---|
| 2014/0032547 A1* | 1/2014 | Webster | G06F 17/30598 |
| | | | 707/736 |
| 2015/0095880 A1 | 4/2015 | Lee | |
| 2015/0135163 A1 | 5/2015 | Mun et al. | |
| 2016/0092336 A1* | 3/2016 | Atanasiu | G06F 11/323 |
| | | | 717/133 |
| 2016/0127254 A1* | 5/2016 | Kumar | H04L 47/70 |
| | | | 709/226 |
| 2016/0154630 A1* | 6/2016 | Zang | G06F 9/44526 |
| | | | 717/109 |
| 2017/0249393 A1* | 8/2017 | Nair | G06F 17/30873 |

OTHER PUBLICATIONS

Werner Vogels, "Elastic Beanstalk a la Node", All Things Distributed, Mar. 2013, Amazon S3.

Oracle, Oracle Launches New Oracle Cloud Platform Services and Enhanced Development Frameworks for Polyglot Development, "https://www.oracle.com/corporate/pressrelease/paasforappdev102715.html", Oct. 27, 2015, Oracle OpenWorld, San Francisco.

Salesforce, Salesforce Console Integration Toolkit Developers Guide, "https://developer.salesforce.com/docs/atlas.en-us.api_console.meta/api_console/sforce_api_console_intro.htm", Dec. 17, 2015, Version 35.0, Winter 16 Salesforce.com, Inc, San Francisco, United States.

* cited by examiner

CLOUD SERVICE FRAMEWORK FOR TOOLKIT DEPLOYMENT

BACKGROUND

Cloud based software development platforms provide developer tools, such as editors, debuggers, compilers, and the like, through a web browser. Developer productivity is enhanced in pure cloud based development platforms by reducing deployment and upgrade hassles, enabling seamless access on any device connected to the internet, promoting enhanced collaboration, and more. However, not all tasks can be performed by a browser, and so hybrid cloud-local development platforms have emerged to provide the benefits of a cloud based platform while retaining some features of running developer tools on a local machine.

Software toolkits are commonly used to enhance developer productivity. Toolkits may contain software libraries, provision of a developer with $3^{rd}$ party code to leverage in their own project. Toolkits also may include emulators, test harnesses, and other tools used in the software development process. Toolkits have traditionally and manually been downloaded and installed on a developer's computer, and updated as the developer saw fit.

One requirement of hybrid development platforms is that toolkits used locally and in the cloud are required to be compatible and/or updated versions. Otherwise, browser based development tools might reference or link to an incompatible software library, causing a runtime error when toolkits are executed in the local environment. Also, the browser based development tools might be unable to invoke local resources, such as emulators and the like.

One of the benefits of cloud based developer tools is also a hindrance when developer tools are implemented in a hybrid cloud-local development platform, i.e., seamless and often unannounced upgrades of toolkits in the cloud can cause incompatibilities with locally installed toolkits. When an incompatibility occurs, developers are left to determine which toolkits need to be installed/updated, determine the version to update to, and locate, download, and install the proper version. This is a cumbersome and time consuming process.

Therefore, there is a need for an improved framework that addresses the above mentioned challenges.

SUMMARY

Described is a system, method, and computer-implemented apparatus for deploying and updating toolkits in hybrid cloud-local development platforms. In one embodiment, a cloud based software development environment is connected with a local development environment, enabling the cloud based software development environment (cloud environment) to inquire into the toolkit versions installed on the local machine. Once missing or incompatible versions of toolkits are identified, the cloud environment uses the connector module to instruct the local machine to download and install the appropriate toolkit versions. The connector may use any types of bi-directional communication channels, such as a browser plugin, a web server hosted on the local machine, web services, or the like.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
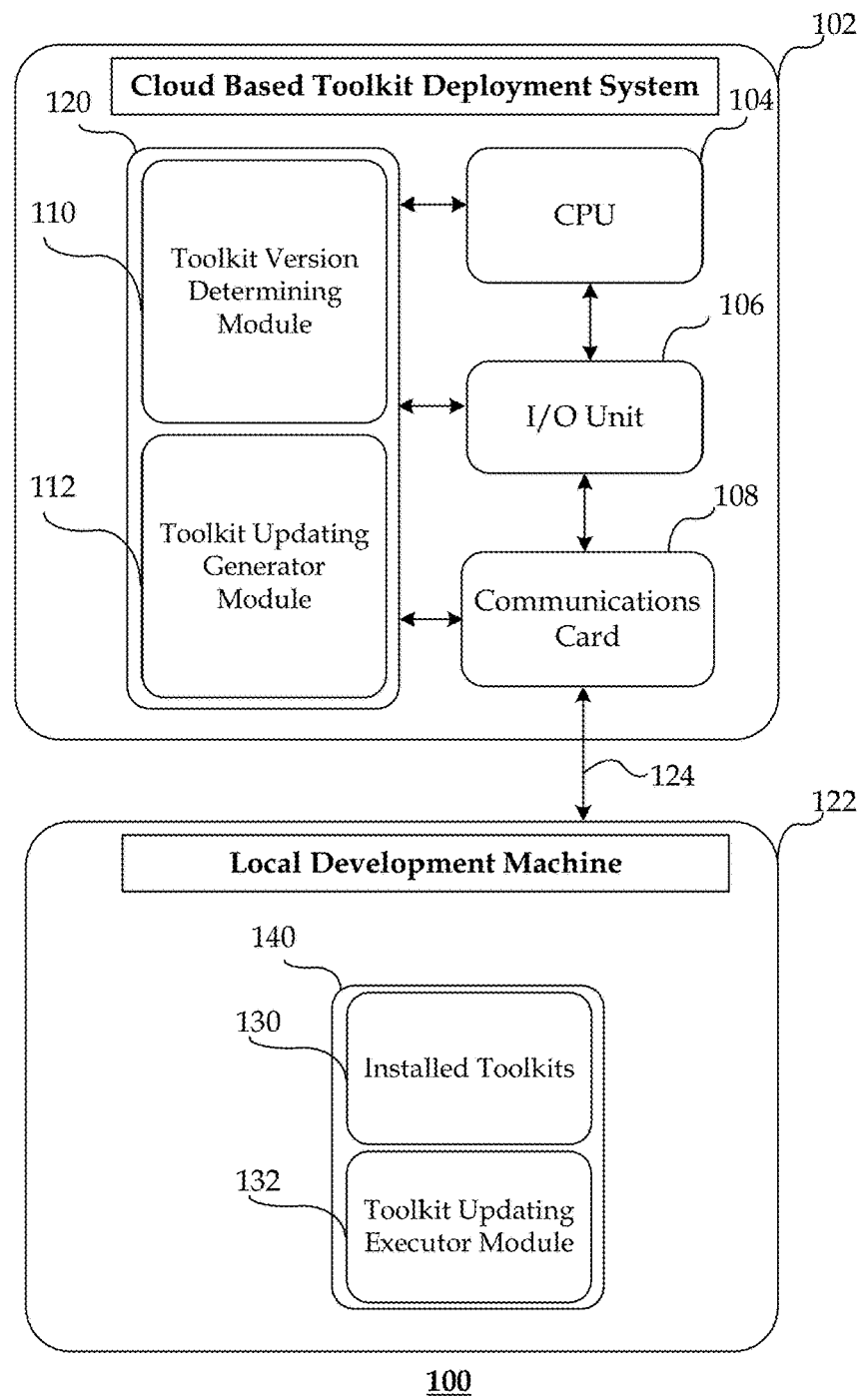
FIG. 1 is a block diagram illustrating an exemplary architecture.

FIG. 1 is a block diagram illustrating an exemplary architecture 100 that may be used for deploying and updating toolkits in hybrid cloud-local development platforms, as described herein. Generally, architecture 100 may include a cloud based toolkit deployment system 102. The cloud based toolkit deployment system 102 can be any type of computing device capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include toolkit versions determining module 110 and toolkit updating generator module 112.

Architecture 100 also includes a local development machine 122 connected to the cloud based toolkit deployment system 102 via connection 124. The local development machine 122 can be also be any type of computing device capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The local development machine may include (not shown) a central processing unit (CPU), an input/output (I/O) unit, a communications card or device (e.g., modem and/or network adapter) for exchanging data with a network (e.g., local area network (LAN) or a wide area network (WAN)). The system may also include a memory module 140. It should be appreciated that the different components and sub-components of the system may be located on different machines or systems. Memory module 140 may include installed toolkits 130 and toolkit updating executor module 132.

In one embodiment, cloud based toolkit deployment system 102 also serves as the cloud based development environment, providing editor, compiler, debugger services, and the like, to local development machine 122 through a browser interface.

Toolkit version determining module 110 includes logic for querying, via connection 124, local development machine 122 to determine what toolkits and which versions are installed. In one embodiment the query is in the form of a command line interface (CLI) command, the results of which are forwarded from local development machine 122 back to toolkit version determining module 110 via connection 124 for evaluation. However, other methods are similarly contemplated, including invoking an operating system (OS) function to determine a version names or number embedded in a file associated with the toolkit.

Toolkit updating generator module 112 includes logic for identifying and determining the compatibility of the toolkit version. In one embodiment a toolkit may be considered incompatible if it has any other version than the version of the corresponding toolkit on the cloud environment. Alternatively, if the toolkit version is denoted with a hierarchical system that represents major and minor revisions, the toolkit updating generator module 112 may determine that a toolkit needs updating only if a major revision has be done. In another embodiment, the version may be represented by a date, and whether a toolkit needs updating is determined based on whether it falls into a predefined date range.

Although any type of software development toolkit, software library, or developer tool can be deployed and updated using the claimed embodiments, throughout this disclosure reference will be made to example toolkits such as Apache Cordova™, which is used to create smartphone applications with Hypertext Markup Language (HTML), JavaScript®, Cascading Style Sheets (CSS), and other web platform technologies. Cordova enables applications developed with web platform technologies to run natively run on many different platforms, such as Android®, iOS®, Windows®, and the like. Cordova translates some of the web platform code into code native to the target platforms, thereby enabling access to a full range of native platform features, while at the same time allowing a developer to create and maintain a single code base. In one embodiment, Cordova scripts and runtime modules are deployed and updated as toolkits.

Installed toolkits 130 includes a repository of toolkits installed on local development machine 122. The toolkits may be installed manually using a package manager, or installed in response to a request from the toolkit updating generator module 112. One example of a package manager is the Node Package Manager (NPM), which exposes a command line interface (CLI), enabling users to download and install JavaScript® packages from a repository, i.e., typically a public repository hosted on the internet. However, other package managers, such as Bower, NuGet, and the like, are similarly contemplated.

Toolkit update executor module 132 includes logic for communicating with toolkit version determining module 110 and toolkit updating generator module 112 over connection 124. In one embodiment, Toolkit update executor module 132 includes a runtime environment, such as node.js, which may expose a web page or web service for interaction with the cloud based toolkit deployment system 102. In this way, bidirectional communication 124 can occur as a web request and web response, web service request and web service response, or the like. Bidirectional communication 124 is preferably implemented as a secure connection, although non-secured connections are similarly contemplated. Bidirectional communication information is received from toolkit updating generator module 112 by a runtime environment such as node.js, and processed in accordance with the claimed embodiments.

Figure 2:
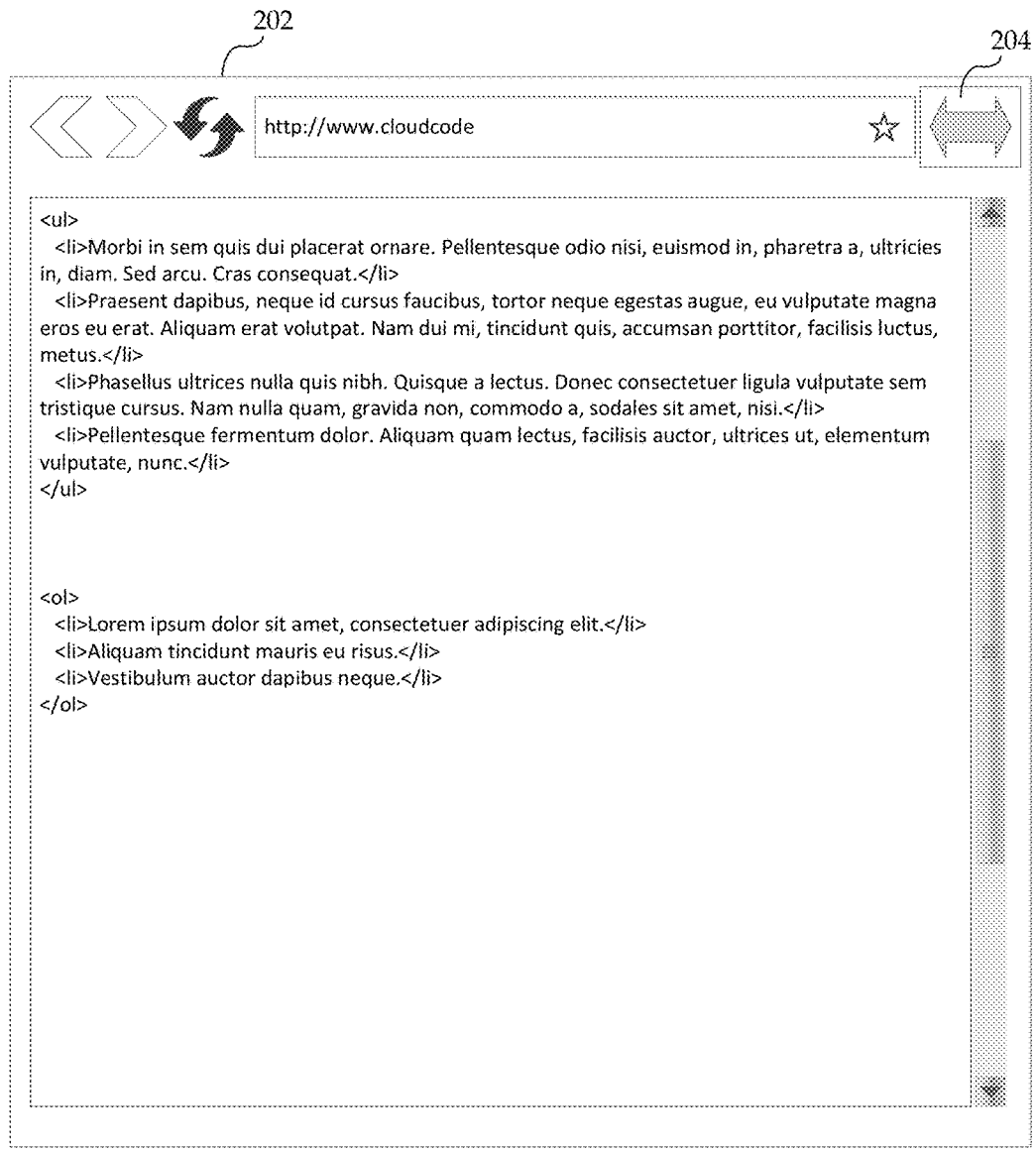
FIG. 2 depicts a browser environment.

FIG. 2 depicts a browser environment 200 running on local development machine 122. Web browser 202 is depicted as having navigated to a cloud based development environment, with an installed plugin 204 that functions as connector 124. Plugin 204 may communicate directly with toolkit update executor module 132, which also resides on development machine 122. Plugin 204 may also communicate with toolkit updating generator module 112 of cloud based toolkit deployment system 102 to invoke an indirect means of determining toolkit versions of local development machine 122. For example, toolkit update executor module 132 may be run on a runtime environment web site or web service, plugin 204 may indirectly invoke the web service via cloud based toolkit deployment system 102 to query for toolkit version information. If a toolkit is found to be out of date, i.e., the date represented by the version falls beyond the predefined date range, plugin 204 may supply the compatible version of the toolkit to toolkit update executor module 132 for installation. Alternatively, plugin 204 may provide a universal resource locator (URL) pointing to an installer of the compatible version of the toolkit. However, plugin 204 is but one embodiment of connector 124, which may reside without a user interface as part of cloud based toolkit deployment system 102.

Figure 3:
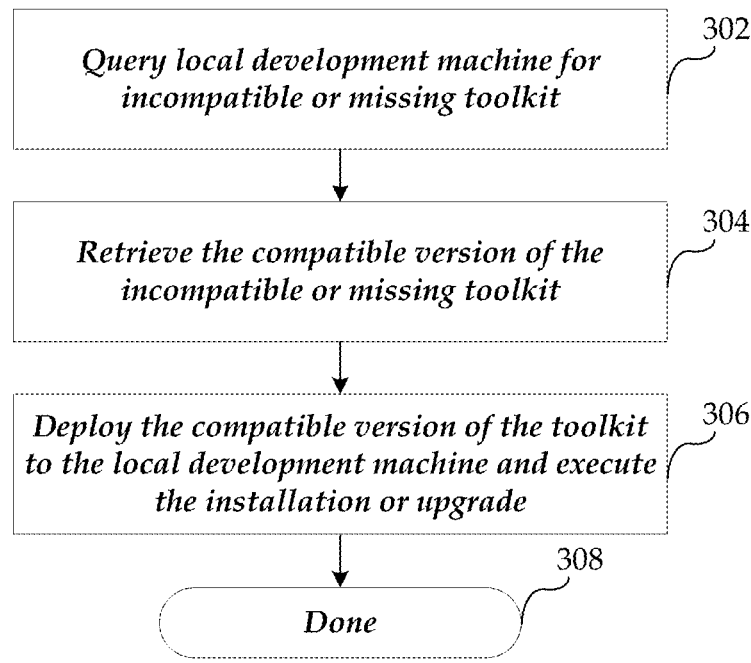
FIG. 3 is a flow chart illustrating an embodiment of a cloud service framework for toolkit deployment.

FIG. 3 is a flow chart 300 illustrating one embodiment of deploying and updating toolkits in hybrid cloud-local development platforms. In one embodiment flow chart 300 is implemented by toolkit version determining module 110 and/or toolkit updating generator module 112 of the cloud based toolkit deployment system 102.

At block 302, a query of local development machine 122 for an incompatible or missing toolkit is performed. In one embodiment, the query is initiated when the connector 124 communication channel is opened.

At block 304, a compatible version of the incompatible or missing toolkit is retrieved. The toolkit may be retrieved from a local cache associated with the cloud based development environment, in which case the version is known to be compatible.

At block 306, the compatible version of the toolkit is deployed to the local developer machine 122 for installation. Installation may be achieved by executing an installer application, a git command, a package manager command, or the like.

In another embodiment, toolkit update executor module 132 is additionally enabled to deploy and execute code from the cloud based development environment. For example, a Cordova application written with web standards such as HTML, JavaScript® and CSS may be transmitted from the cloud based development environment to the local development machine 122, and toolkit update executor module 132 may then invoke the Cordova toolkit to translate the received HTML code into a partially native application. The toolkit update executor module 132 may also launch an emulator and initialize execution of the Cordova application in the emulator. In this way, code developed in the cloud development environment can be debugged locally. In another embodiment, runtime modules required to execute the received code are also received by toolkit update executor module 132 and made available for local execution of the translated application.

At block 308, the process 300 ends.

The invention claimed is:

1. A computer-implemented method for toolkit deployment, comprising:
   opening a connection between a server and a local software development environment, the server hosting a cloud based development environment, the local software development environment comprising a web browser with a plugin that functions as the connector, the server and the local software development environment forming part of a hybrid development platform providing both local and cloud-based software development functionality;
   in response to opening the connection, invoking, by the plugin, a web service to query the local software development environment to determine a version of an installed software toolkit;
   determining if the determined version of the installed software toolkit is compatible with the server by retrieving the installed software toolkit from a local cache associated with the cloud based development environment;
   when the determined version of the installed software toolkit is not compatible with the server, deploying a compatible version of the toolkit to the local software development environment and initiating installation of the compatible version of the toolkit; and
   initiating, in the local software development using the installed software toolkit, an emulator that is configured to debug code generated at the server in the local software development environment.

2. The computer-implemented method of claim 1, wherein the connection between the server and the local software development environment includes a connection between a software update module on the server and a runtime environment running on the local software development environment.

3. The computer-implemented method of claim 2, wherein the runtime environment includes a node.js runtime environment, and wherein the connection between the server and the local software development environment is in part connected to a web service hosted by the node.js runtime environment.

4. The computer-implemented method of claim 1, wherein determining if the determined version of the installed software toolkit is compatible with the server includes determining if a compatible version of the installed software toolkit is in use by the server.

5. The computer-implemented method of claim 1, wherein the server provides at least one of in-browser editor, compiler, or debugger services, and wherein the server and the local development environment use the same toolkit.

6. A computing apparatus for toolkit deployment, comprising:
   a processor; and
   a memory storing instructions that, when executed by the processor, configures the apparatus to:
      open a connection between a server and a local software development environment, the server hosting a cloud based development environment, the local software development environment comprising a web browser with a plugin that functions as the connector, the server and the local software development environment forming part of a hybrid development platform providing both local and cloud-based software development functionality;
      in response to opening the connection, invoke, by the plugin, a web service to query the local software development environment to determine a version of an installed software toolkit;
      determine if the determined version of the installed software toolkit is compatible with the server by retrieving the installed software toolkit from a local cache associated with the cloud based development environment;
      when the determined version of the installed software toolkit is not compatible with the server, deploy a compatible version of the toolkit to the local software development environment and initiating installation of the compatible version of the toolkit; and
      initiate, in the local software development using the installed software toolkit, an emulator that is configured to debug code generated at the server in the local software development environment.

7. The computing apparatus of claim 6, wherein the connection between the server and the local software development environment includes a connection between a software update module on the server and a runtime environment running on the local software development environment.

8. The computing apparatus of claim 7, wherein the runtime environment includes a node.js runtime environment, and wherein the connection between the server and the local software development environment is in part connected to a web service hosted by the node.js runtime environment.

9. The computing apparatus of claim 6, wherein the connection is opened in response to a local web browser navigating to a cloud based development environment hosted by the server.

10. The computing apparatus of claim 6, wherein the server and the local software environment include a hybrid software development environment, wherein the server and the local software environment execute the installed software toolkit.

11. The computing apparatus of claim 6, wherein the installed software toolkit is not installed on the local software development environment.

12. A non-transitory computer-readable storage medium for toolkit deployment, the computer-readable storage medium including instructions that when executed by a computer, cause the computer to:
   open a connection between a server and a local software development environment, the server hosting a cloud based development environment, the local software development environment comprising a web browser with a plugin that functions as the connector, the server and the local software development environment forming part of a hybrid development platform providing both local and cloud-based software development functionality;
   in response to opening the connection, invoke, by the plugin, a web service to query the local software development environment to determine a version of an installed software toolkit;
   determine if the determined version of the installed software toolkit is compatible with the server by retrieving the installed software toolkit from a local cache associated with the cloud based development environment, wherein the toolkit version is denoted with a hierarchical system that represents major and minor revisions and the toolkit is deemed incompatible with the server only if a major revision has be done; and when the determined version of the installed software toolkit is not compatible with the server, deploy a compatible version of the toolkit to the local software development environment and initiating installation of the compatible version of the toolkit.

13. The non-transitory computer-readable storage medium of claim 12, wherein the connection between the server and the local software development environment includes a connection between a software update module on the server and a runtime environment running on the local software development environment.

14. The non-transitory computer-readable storage medium of claim 12, wherein the compatible version of the toolkit is installed by executing, on the local software development environment, a command line interface command generated by the server.

15. The non-transitory computer-readable storage medium of claim 12, wherein the toolkit includes a software execution platform, wherein the server provides compiler services, wherein the server compiles a source code using a defined version of the toolkit, and wherein determining if the determined version of the installed software toolkit is compatible with the server includes determining if a version of the installed software toolkit matches the defined version of the toolkit used to compile the source code.

16. The non-transitory computer-readable storage medium of claim 12, wherein installation of the compatible version of the toolkit includes activating a package manager on the local development environment.

17. The non-transitory computer-readable storage medium of claim 12, wherein installation of the compatible version of the toolkit includes providing, to a web browser running in the local development environment, a Uniform Resource Locater to an installer of the compatible version of the toolkit.

* * * * *